Patented Nov. 14, 1939

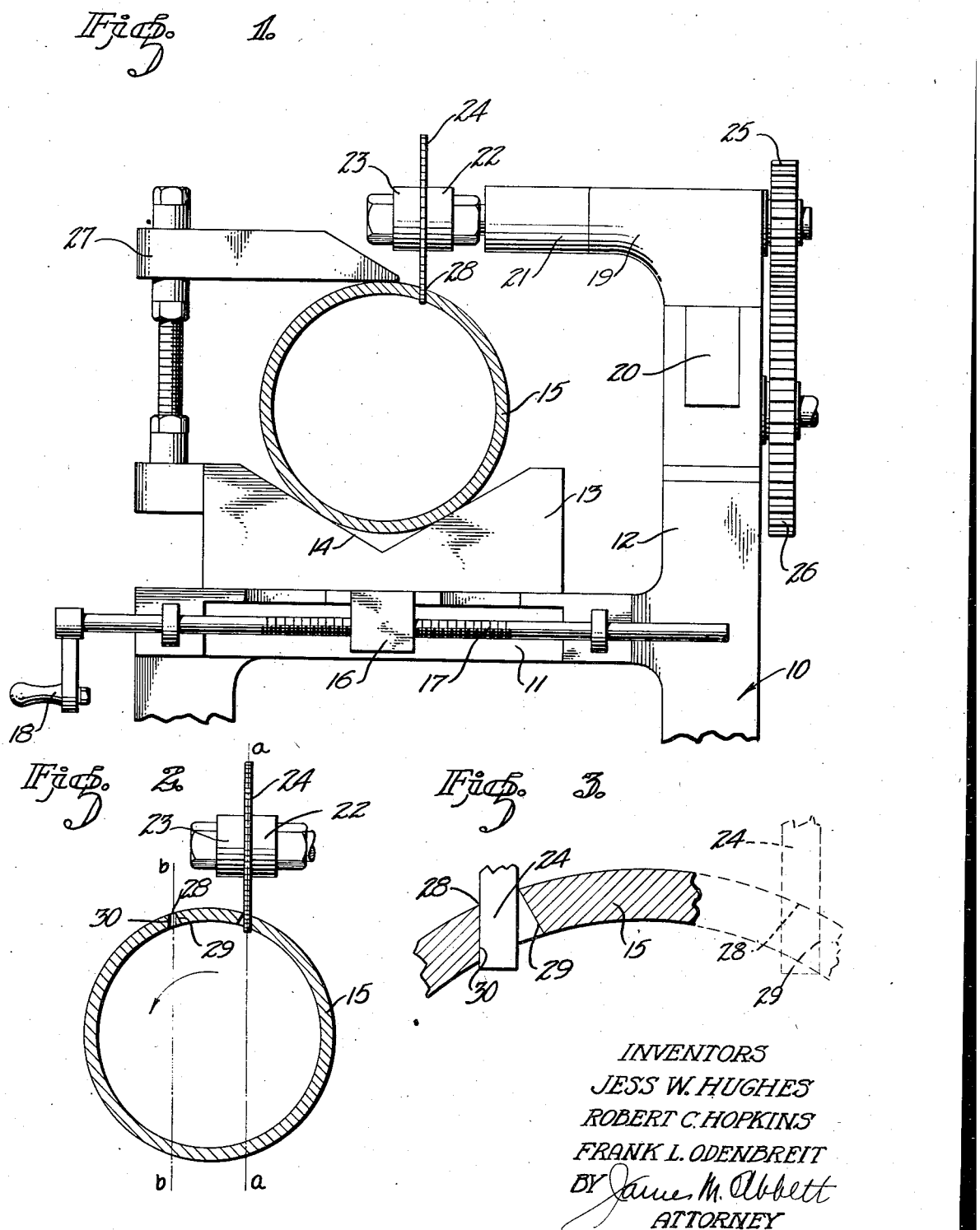

2,180,331

UNITED STATES PATENT OFFICE 2,180,331

METHOD OF PERFORATING PIPE

Jess W. Hughes, Robert C. Hopkins, and Frank L. Odenbreit, Long Beach, Calif.

Application July 7, 1937, Serial No. 152,356

1 Claim. (Cl. 29—69)

This invention relates to the preparation of slotted or perforated pipe, and particularly pertains to a method of perforating pipe.

In the preparation of wells for production, and particularly in connection with oil wells, it is common practice to prepare and place sections of pipe within the well, the walls of which are perforated to permit fluid to flow from the formation surrounding the pipe and through the walls of the pipe where it may be pumped or otherwise drawn from the well. In connection with such operations it has been found that when pipe is formed with longitudinal slots which are undercut on their inner sides to present a relatively narrow throat for the incoming fluids, and a wide throat through which the fluids pass into the pipe, the desired advantage is obtained of insuring that the high fluid velocity created by the restricted inlet passageway, and thereafter relieved in the widened throat of the slot, tends to prevent the accumulation of sand and debris in the slots so that they are in effect self-cleaning. Various devices have been provided for forming such slots and undercutting them, but these structures for the most part have been complicated in design and have required that the cutting members or the support for the pipe shall embody complicated adjusting means so that the cutting members will undercut the side walls of the slot, and it is the principal object of the present invention therefore, to provide a method of forming perforations in pipe with undercut side walls, the said perforations being made by simple operation and the use of simple instrumentalities which do not require complicated adjustment or manipulation and which insure that the pipe may be rapidly slotted, and its walls undercut while the pipe and the cutter are held in fixed rigid relationship to each other.

The present invention utilizes a device for receiving and gripping a pipe and for transversely moving the same with relation to a rotary cutting element whereby the central axis of the pipe will at all times be in a plane parallel to the central axis of the rotary cutter, and offset from the vertical plane of the central axis while the cutter is maintained parallel thereto.

The invention is practiced by way of the device illustrated in the accompanying drawing in which:

Figure 1 is a view in section and end elevation showing the initial pipe cutting operation.

Fig. 2 is a view in diagram showing the final step in perforating the pipe.

Fig. 3 is an enlarged view in section showing the pipe perforation as completed.

Referring more particularly to the drawing, 10 indicates a frame of a machine for perforating pipe. This frame carries a bed portion 11 and an upright arm 12. Mounted upon the bed portion 11 is a cradle 13 which is in the form of a block having a V-shaped face 14 thereon, and into which a pipe 15 to be perforated may be seated. A threaded lug 16 extends downwardly from this block and receives a screw 17 which is operated by a crank or wheel 18 at one end thereof. The screw 17 is rotatably supported within the bed portion 11 and will move the cradle 13 transversely of the machine to provide an adjustment to be hereinafter described. The upright arm 12 carries a bearing head 19 which is vertically adjustable and may vertically feed by suitable mechanism, such for example as the hydraulic cylinder 20. The head 19 is here shown as carrying a horizontally disposed spindle 21. Upon this spindle are collars 22 and 23 between which a slitting saw 24 is secured upon the spindle 21. It is to be understood that it is common practice to operate a plurality of these saws at the same time and in the same vertical plane so that a length of pipe may be formed with a plurality of slits at one setting of the pipe upon the cradle 13. These saws may be simultaneously driven by gears 25 carried by the spindles and by driving gears 26 placed in driving operation with a source of power supply not here shown. The present invention is not concerned with the details of construction of the mechanism by which the slots are formed other than the mechanism is designed so that the spindle 21 shall have a fixed aligned position with relation to the cradle 13 and so that the central axis of the slitting saw 24 will be in a plane parallel with the central axis of the pipe 15, which is being slit.

In performing the method with which the present invention is concerned the pipe is held in position upon the cradle 13 by a suitable clamping arm 27. The cradle 13 is laterally adjusted in a plane parallel to the plane of the central axis of the spindle 21. This lateral adjustment is made to offset the cutter with relation to a vertical plane within which the longitudinal center of the pipe 15 lies. It will be seen that the cutter 24 when thus offset will lie in a vertical plane parallel to the one in which the longitudinal center of the pipe 15 lies and that the rotating axis of the cutter will be at right angles to the longitudinal center of the pipe. After the cradle 13 has been thus laterally adjusted and set by the rotation of the adjusting screw 17 and the handle 18 the cutting operation may be performed. Attention is directed to the fact that when the cutting operation is performed by the machine here disclosed the spindle 21 of the cutter will be rigidly held in relation to the pipe and the machine, and that the slit is made without requiring that the slitting saw 24 shall be inclined in any direction, but that it will be maintained at all times in a parallel plane to the vertical plane within which the longitudinal center of the pipe occurs. Thus a rapid cutting operation can be performed since the cutter will be firmly held against chattering and will permit the cutter and the pipe to be rapidly moved with relation to each other as the cutter moves through the wall of the pipe in making the desired slit.

The present method involves two cutting operations without the necessity of readjustment of the cutter to dispose it at any definite angle from that assumed by it during the first cutting operation. The invention also contemplates that the pipe will be held rigidly in its cradle and on a base, and that it will not be necessary to provide rocking means or the like for the pipe to bodily swing it to other positions with relation to the cutting plane of the slitting saw 24. After a longitudinal slit, or a series of longitudinal slits in a common plane have been made by the slitting saws 24 at one side of the central vertical plane within which the longitudinal center of the pipe lies, two methods of undercutting the straight slot may be employed. After the pipe has been clamped in position so that its longitudinal axis stands horizontally and the cutter has formed a slot through the wall or has formed a series of slots through the wall 29 in a vertical plane extending longitudinally of the pipe and offset laterally a predetermined distance from the vertical plane in which the longitudinal axis of the pipe lies, the pipe is removed from its clamped position. The pipe is then reversed end for end, and clamped again with its longitudinal axis in the same position it occupied for the first series of cuts but with the pipe rotated until the opening of the slots in the outer face of the pipe wall will register with the cutter. It will thus be evident that the previously formed slot will have its walls at an angle to the cutting plane and that when a new series of cuts is made through the previously formed slots, one wall of the previously formed slots will be cut away so that the slots will be under-cut with their opposite walls at equal angles to a radial center line. Thus a slot will be formed as shown in Fig. 3 having a restricted outer throat 28 and inwardly inclined side walls 29 and 30, the side wall 30 having been cut during the first slitting operation, and the side 29 having been cut during the second slitting operation. It is also evident that the pipe 15 could be released for rotation upon its axis without moving the cradle to place the slot in the plane b at the opposite side of the longitudinal center plane of the pipe after which the cradle could be laterally shifted to place the outer opening 28 of the slot in alignment with the slitting saw so that the opposite side of the undercut slot could be formed while the pipe and the cutter retain a rigid fixed relationship with the cutter in the vertical plane a at all times.

It will thus be seen that by the arrangement here disclosed undercut slots may be formed in the wall of a pipe or in the surface of any cylindrical member by the use of a single slitting saw rotating at all times on its horizontal axis which axis is at all times in parallel alignment with the plane within which the longitudinal center of the pipe lies, and it will be further evident that by this method the pipe may be rigidly held, the cutter rigidly supported, and the slots formed rapidly by a simple and directly acting mechanism.

While we have disclosed the preferred method of practicing our invention, and the preferred form of device by which the said invention may be carried out, it is to be understood that various changes can be made in the steps of the method without departing from the spirit of the invention as claimed.

Having thus described our invention, what we claim and desire to secure by Letters Patent is:

A method of forming an under-cut slot in a cylindrical pipe or the like, which consists in placing the pipe in a fixed position with its longitudinal center laterally offset with relation to a cutter, said cutter acting to cut a slot through the wall of the pipe in a vertical plane offset from the vertical plane occupied by the longitudinal center of the pipe, thereafter turning the pipe end for end and fixing it with its longitudinal center in the same plane which it previously occupied and with the outer opening of the slots in the offset vertical plane of the cutter, then forming a second cut through said opening whereby an undercut slot will be completed having its side walls disposed at the same angle to a radial center line of the slot.

JESS W. HUGHES.
ROBERT C. HOPKINS.
FRANK L. ODENBREIT.